US008589824B2

(12) United States Patent
Hillis et al.

(10) Patent No.: US 8,589,824 B2
(45) Date of Patent: Nov. 19, 2013

(54) GESTURE RECOGNITION INTERFACE SYSTEM

(75) Inventors: William Daniel Hillis, Encino, CA (US); H Keith Nishihara, Los Altos, CA (US); Shi-Ping Hsu, Pasadena, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 944 days.

(21) Appl. No.: 11/485,788

(22) Filed: Jul. 13, 2006

(65) Prior Publication Data

US 2008/0013826 A1    Jan. 17, 2008

(51) Int. Cl.
*G06F 3/033*    (2013.01)
(52) U.S. Cl.
USPC ............................ 715/863; 715/856; 382/103
(58) Field of Classification Search
USPC .................... 715/856, 863; 382/103
See application file for complete search history.

(56) References Cited

U.S. PATENT DOCUMENTS

| | | | |
|---|---|---|---|
| 4,468,694 A * | 8/1984 | Edgar ........................... | 348/135 |
| 4,843,568 A | 6/1989 | Krueger et al. | |
| 4,924,506 A | 5/1990 | Crossley et al. | |
| 5,220,441 A | 6/1993 | Gerstenberger | |
| 5,239,373 A | 8/1993 | Tang et al. | |
| 5,475,422 A * | 12/1995 | Mori et al. ................... | 348/48 |
| 5,483,261 A * | 1/1996 | Yasutake ...................... | 345/173 |
| 5,563,988 A | 10/1996 | Maes et al. | |
| 5,913,727 A | 6/1999 | Ahdoot | |
| 5,999,185 A | 12/1999 | Kato et al. | |
| 6,002,808 A * | 12/1999 | Freeman ....................... | 382/288 |
| 6,128,003 A * | 10/2000 | Smith et al. .................. | 345/157 |
| 6,147,678 A * | 11/2000 | Kumar et al. ................. | 345/158 |
| 6,195,104 B1 | 2/2001 | Lyons | |
| 6,204,852 B1 * | 3/2001 | Kumar et al. ................. | 345/419 |

(Continued)

FOREIGN PATENT DOCUMENTS

| | | |
|---|---|---|
| DE | 197 39 285 C1 | 11/1998 |
| EP | 0 571 702 A2 | 12/1993 |

(Continued)

OTHER PUBLICATIONS

British Search Report for corresponding GB 0909597.7 completed Sep. 17, 2009.

(Continued)

*Primary Examiner* — Tuyetlien Tran
(74) *Attorney, Agent, or Firm* — Tarolli, Sundheim, Covell & Tummino LLP (57) ABSTRACT

A system and method is provided for a gesture recognition interface system. The interface system may comprise a first and second light source positioned to illuminate a background surface. The interface system may also comprise at least one camera operative to receive a first plurality of images based on a first reflected light contrast difference between the background surface and a sensorless input object caused by the first light source and a second plurality of images based on a second reflected light contrast difference between the background surface and the sensorless input object caused by the second light source. The interface system may further comprise a controller operative to determine a given input gesture based on changes in relative locations of the sensorless input object in the first plurality of images and the second plurality of images. The controller may further be operative to initiate a device input associated with the given input gesture.

29 Claims, 6 Drawing Sheets

(56) References Cited

U.S. PATENT DOCUMENTS

| | | | |
|---|---|---|---|
| 6,222,465 B1* | 4/2001 | Kumar et al. | 341/20 |
| 6,327,381 B1 | 12/2001 | Rogina et al. | |
| 6,353,428 B1 | 3/2002 | Maggioni et al. | |
| 6,359,612 B1 | 3/2002 | Peter et al. | |
| 6,434,255 B1 | 8/2002 | Harakawa | |
| 6,512,507 B1 | 1/2003 | Furihata et al. | |
| 6,624,833 B1* | 9/2003 | Kumar et al. | 715/863 |
| 6,681,031 B2* | 1/2004 | Cohen et al. | 382/103 |
| 6,695,770 B1 | 2/2004 | Choy et al. | |
| 6,714,901 B1 | 3/2004 | Cotin et al. | |
| 6,720,949 B1 | 4/2004 | Pryor et al. | |
| 6,788,809 B1 | 9/2004 | Grzeszczuk et al. | |
| 6,796,656 B1 | 9/2004 | Dadourian | |
| 6,806,849 B2 | 10/2004 | Sullivan | |
| 6,857,746 B2 | 2/2005 | Dyner | |
| 6,950,534 B2 | 9/2005 | Cohen et al. | |
| 6,956,573 B1 | 10/2005 | Bergen et al. | |
| 6,983,065 B1* | 1/2006 | Akgul et al. | 382/141 |
| 7,042,440 B2 | 5/2006 | Pryor et al. | |
| 7,129,927 B2 | 10/2006 | Mattsson | |
| 7,259,747 B2 | 8/2007 | Bell | |
| 7,701,439 B2 | 4/2010 | Hillis et al. | |
| 2001/0006426 A1 | 7/2001 | Son et al. | |
| 2001/0043719 A1 | 11/2001 | Harakawa et al. | |
| 2002/0090146 A1 | 7/2002 | Heger et al. | |
| 2002/0093666 A1* | 7/2002 | Foote et al. | 356/621 |
| 2002/0122113 A1* | 9/2002 | Foote | 348/48 |
| 2002/0126161 A1 | 9/2002 | Kuzunuki et al. | |
| 2002/0186221 A1 | 12/2002 | Bell | |
| 2003/0058341 A1 | 3/2003 | Brodsky et al. | |
| 2003/0067537 A1 | 4/2003 | Myers | |
| 2003/0085866 A1 | 5/2003 | Bimber et al. | |
| 2003/0218761 A1* | 11/2003 | Tomasi et al. | 356/627 |
| 2004/0046747 A1 | 3/2004 | Bustamante | |
| 2004/0108990 A1 | 6/2004 | Lieberman et al. | |
| 2004/0113885 A1 | 6/2004 | Genc et al. | |
| 2004/0125207 A1 | 7/2004 | Mittal et al. | |
| 2004/0183775 A1 | 9/2004 | Bell | |
| 2004/0193413 A1 | 9/2004 | Wilson et al. | |
| 2004/0239761 A1 | 12/2004 | Jin et al. | |
| 2005/0002074 A1 | 1/2005 | McPheters et al. | |
| 2005/0012817 A1 | 1/2005 | Hampapur et al. | |
| 2005/0052714 A1 | 3/2005 | Klug et al. | |
| 2005/0068537 A1 | 3/2005 | Han et al. | |
| 2005/0088714 A1 | 4/2005 | Kremen | |
| 2005/0110964 A1 | 5/2005 | Bell et al. | |
| 2005/0151850 A1 | 7/2005 | Ahn et al. | |
| 2005/0166163 A1 | 7/2005 | Chang et al. | |
| 2005/0275628 A1 | 12/2005 | Balakrishnan et al. | |
| 2005/0285945 A1 | 12/2005 | Usui et al. | |
| 2005/0286101 A1 | 12/2005 | Garner et al. | |
| 2006/0010400 A1* | 1/2006 | Dehlin et al. | 715/856 |
| 2006/0036944 A1 | 2/2006 | Wilson | |
| 2006/0052953 A1 | 3/2006 | Vilanova et al. | |
| 2006/0092178 A1 | 5/2006 | Tanguay | |
| 2006/0125799 A1 | 6/2006 | Hillis et al. | |
| 2006/0187196 A1 | 8/2006 | Underkoffler et al. | |
| 2006/0203363 A1 | 9/2006 | Levy-Rosenthal | |
| 2006/0209021 A1 | 9/2006 | Yoo et al. | |
| 2007/0024590 A1 | 2/2007 | Krepec | |
| 2007/0064092 A1 | 3/2007 | Sandbeg et al. | |
| 2008/0013826 A1 | 1/2008 | Hillis et al. | |
| 2008/0150913 A1 | 6/2008 | Bell et al. | |
| 2008/0244468 A1 | 10/2008 | Nishihara et al. | |
| 2009/0015791 A1 | 1/2009 | Chang et al. | |
| 2009/0103780 A1 | 4/2009 | Nishihara et al. | |
| 2009/0115721 A1 | 5/2009 | Aull et al. | |

FOREIGN PATENT DOCUMENTS

| | | |
|---|---|---|
| EP | 0 571 702 A3 | 12/1993 |
| EP | 1 223 537 A2 | 12/2001 |
| EP | 1 689 172 A1 | 8/2006 |
| EP | 1 879 129 A1 | 1/2008 |
| EP | 1 879 130 A2 | 1/2008 |
| EP | 2 056 185 A2 | 5/2009 |
| EP | 2 068 230 A2 | 6/2009 |
| GB | 2460937 A | 12/2009 |
| JP | 62264390 A | 1/1987 |
| JP | 4271423 A | 2/1991 |
| JP | 04031996 A | 2/1992 |
| WO | WO 98/13746 | 4/1998 |
| WO | WO 00/55802 A | 9/2000 |
| WO | WO 03/026299 A1 | 3/2003 |
| WO | WO 2008/001202 A3 | 1/2008 |

OTHER PUBLICATIONS

British Search Report for corresponding GB0910067.8, completed Oct. 15, 2009.

De Office Action for corresponding DE 10 2009 043 798.3, issued Nov. 10, 2010.

Dubois, et al.: "In Vivo Measurement of Surgical Gestures"; IEEE Transactions on Biochemical Engineering, vol. 49, No. 1, Jan. 2002, pp. 49-54.

EP Search Report for corresponding EP 07 25 2870 completed Aug. 16, 2010 by Suphi Umut Naci of the Hague.

European Search Report for corresponding EP 07 25 2717 completed Sep. 27, 2007 by Martin Müller of the EPO.

Fiorentino, et al.: "Spacedesign: A Mixed Reality Workspace for Aesthetic Industrial Design"; Mixed and Augmented Reality, 2002. ISMAR 2002. Proceedings. International Symposium on Sep. 30-Oct. 1, 2002, Piscataway, NJ, USA, IEEE, Sep. 30, 2002, pp. 86-318, XP010620945, ISBN: 0-7695-1781-1; Abstract, Figs. 1, 2; p. 86, left-hand col., ¶4; p. 87, left-hand col., ¶4-right-hand col.

German Office Action for corresponding DE 10 2009 034 413.6-53, issued Sep. 29, 2010.

Kjeldsen, et al.: "Toward the Use of Gesture in Traditional User Interfaces"; Automatic Face and Gesture Recognition, 1996, Proceedings of the Second International Conference on Killington, VT, USA 14-16 Oct. 14, 1996' Los Alamitos, CA, USA, IEEE Comput. Soc., ISBN 978-0-8186-7713-7; whole document.

Korida, K et al: "An Interactive 3D Interface for a Virtual Ceramic Art Work Environment"; Virtual Systems and Multimedia, 1997. VSMM '97. Proceedings., International Conference on Geneva, Switzerland Sep. 10-12, 1997, Los Alamitos, CA, USA, IEEE Comput. Soc, US, Sep. 10, 1997, pp. 227-234, XP010245649, ISBN: 0-8186-8150-0; Abstract, Figs. 1, 2, 5, 7-11.

Leibe, et al.: "Toward Spontaneous Interaction with the Perceptive Workbench"; IEEE Computer Graphics and Applications; p. 54-65XP-000969594; Nov./Dec. 2000.

Mitchell: "Virtual Mouse"; IP.COM Inc, West Henrietta, NY, US, May 1, 1992 ISSN 1533-0001; whole document.

Office Action for corresponding DE 10 2009 025 236.3, issued May 2010.

Pajares, et al.: "Usability Analysis of a Pointing Gesture Interface"; Systems, Man and Cybernetic, 2004 IEEE International Conference on , Oct. 10, 2004, ISBN 978-0-7803-8566-5; see e.g. sections 2.1 and 4.

Plesniak, W et al.: "Spatial Interaction with Haptic Holograms"; Multimedia Computing and Systems, 1999, IEEE International Conference on Florence, Italy Jun. 7-11, 1999, Los Alamitos, CA USA, IEEE Comput. Soc. US, vol. 1, Jun. 7, 1999, pp. 413-426, XP010342817 ISBN: 0-7695-0253-9; Abstract, Figs. 7, 8.

Sato, Y et al.: "Real-Time Input of 3D Pose and Gestures of a User's Hand and Its Applications for HCI"; Proceedings IEEE 2001 virtual Reality. (VR). Yokohama, Japan, Mar. 13, 2001, pp. 79-86, XP010535487; ISBN: 0-7695-0948-7; Abstract, Figs. 3, 4, 6, 8.

Search Report for corresponding British application No. GB0917797.3; completed Jan. 28, 2010 by Mr. Jeremy Cowen.

Search Report for corresponding GB 0715481.8, Date of Search: Nov. 27, 2007.

Search Report for corresponding GB 0913330.7; Completed Nov. 3, 2009 by Dr. Russell Maurice.

(56) References Cited

OTHER PUBLICATIONS

Sutcliffe, et al.: "Presence, Memory and Interaction in Virtual Environments"; International Journal of Human-Computer Studies, 62 (2005), pp. 307-327.

Vámossy, et al.: "Virtual Hand—Hand Gesture Recognition System"; SISY 2007, 5th International Symposium on Intelligent Systems and Informatics, Aug. 24-25, 2007, Subolica, Serbia, IEEE, p. 97-102.

* cited by examiner

GESTURE RECOGNITION INTERFACE SYSTEM

TECHNICAL FIELD

The present invention relates generally to interface systems, and specifically to a gesture recognition interface system.

BACKGROUND

As the range of activities accomplished with a computer increases, new and innovative ways to provide an interface with a computer are often developed to complement the changes in computer functionality and packaging. For example, touch sensitive screens can allow a user to provide inputs to a computer without a mouse and/or a keyboard, such that desk area is not needed to operate the computer. Examples of touch sensitive screens include pressure sensitive membranes, beam break techniques with circumferential light sources and sensors, and acoustic ranging techniques. However, these types of computer interfaces can only provide information to the computer regarding the touch event, itself, and thus can be limited in application. In addition, such types of interfaces can be limited in the number of touch events that can be handled over a given amount of time, and can be prone to interpret unintended contacts, such as from a shirt cuff or palm, as touch events. Furthermore, touch sensitive screens can be prohibitively expensive and impractical for very large display sizes, such as those used for presentations.

SUMMARY

One embodiment of the present invention may include a gesture recognition interface system. The interface system may comprise a first and second light source positioned to illuminate a background surface. The interface system may also comprise at least one camera operative to receive a first plurality of images based on a first reflected light contrast difference between the background surface and a sensorless input object caused by the first light source and a second plurality of images based on a second reflected light contrast difference between the background surface and the sensorless input object caused by the second light source. The interface system may further comprise a controller operative to determine a given input gesture based on changes in relative locations of the sensorless input object in the first plurality of images and the second plurality of images. The controller may further be operative to initiate a device input associated with the given input gesture.

Another embodiment of the present invention includes a method for providing inputs. The method may comprise illuminating a background surface with a first light source and a second light source and providing simulated inputs over the background surface via gestures associated with a sensorless input object. The method may also comprise generating a first plurality of images associated with the sensorless input object based on a reflected light contrast between the sensorless input object and the illuminated background surface caused by the first light source and generating a second plurality of images associated with the sensorless input object based on a reflected light contrast between the sensorless input object and the illuminated background surface caused by the second light source. The method may also comprise determining a plurality of three-dimensional physical locations of the sensorless input object based on a relative separation of the sensorless input object in the first plurality of images relative to the second plurality of images and determining if changes in the plurality of three-dimensional physical locations of the sensorless input object correspond to any of a plurality of pre-defined gestures. The method may further comprise providing at least one device input based on a given one of the plurality of pre-defined gestures upon determining that the changes in the plurality of three-dimensional physical locations of the sensorless input object correspond to the given one of the plurality of pre-defined gestures.

Another embodiment of the present invention includes a gesture recognition interface system. The interface system may comprise means for providing a first brightness contrast between a background surface and a sensorless input object and means for providing a second brightness contrast between the background surface and the sensorless input object. The interface system may also comprise means for generating a first plurality of images of the sensorless input object based on the first brightness contrast and means for generating a second plurality of images of the sensorless input object based on the second brightness contrast. The first plurality of images and the second plurality of images could form a plurality of matched pairs of images of the sensorless input object. The interface system may also comprise means for generating two-dimensional location information associated with at least one end-point of the sensorless input object for each of the first plurality of images and the second plurality of images. The interface system could also comprise means for interpolating three-dimensional location information associated with the sensorless input object based on the two-dimensional location information associated with the at least one end-point of the sensorless input object for each of the plurality of matched pairs of images of the sensorless input object. The interface system could further comprise means for translating changes in the three-dimensional location information associated with at least one end-point of the sensorless input object to a given input gesture and means for providing device inputs based on matching the given input gesture with one of a plurality of pre-defined gestures.

DETAILED DESCRIPTION

The present invention relates generally to interface systems, and specifically to a gesture recognition interface system. A user employs a sensorless input object to provide simulated inputs to a computer or other electronic device. It is to be understood that the simulated inputs are provided by gestures using the sensorless input object. For example, the user could provide gestures that include motion and/or contact with a background surface using the sensorless input object. The sensorless input object could be, for example, the user's hand; a wand, stylus, pointing stick; or a variety of other devices with which the user can gesture. The simulated inputs could be, for example, simulated mouse inputs. A plurality of infrared (IR) light sources illuminate the sensorless input object and the background surface behind the sensorless input object to generate a plurality of images of the sensorless input object. The plurality of images of the sensorless input object could be, for example, a plurality of matched pairs of images of the sensorless input object, such that each image of the matched pair corresponds to the sensorless input object from a different perspective at substantially the same time. A given matched pair of images can be employed to determine a location of the sensorless input object and the plurality of matched pairs of images can be employed to determine physical motion of the sensorless input object. The plurality of images could be, for example, a plurality of shadows of the sensorless input object or a plurality of silhouettes of the sensorless input object.

A controller can be operative to receive the plurality of images to determine three-dimensional location information associated with the sensorless input object. For example, the controller could apply an algorithm to determine the location of one or more end-points of the sensorless input object, such as the user's fingertips, in three-dimensional space. The controller could then translate the simulated inputs into device inputs based on the three-dimensional location information. For example, the controller could interpret gesture inputs based on motion associated with the one or more end-points of the sensorless input object and translate the gesture inputs into inputs to a computer or other device. The controller could also compare the motion associated with the one or more end-points of the sensorless input object with a plurality of pre-defined gestures stored in a memory, such that a match with a given pre-defined gesture could correspond with a particular device input.

Figure 1:
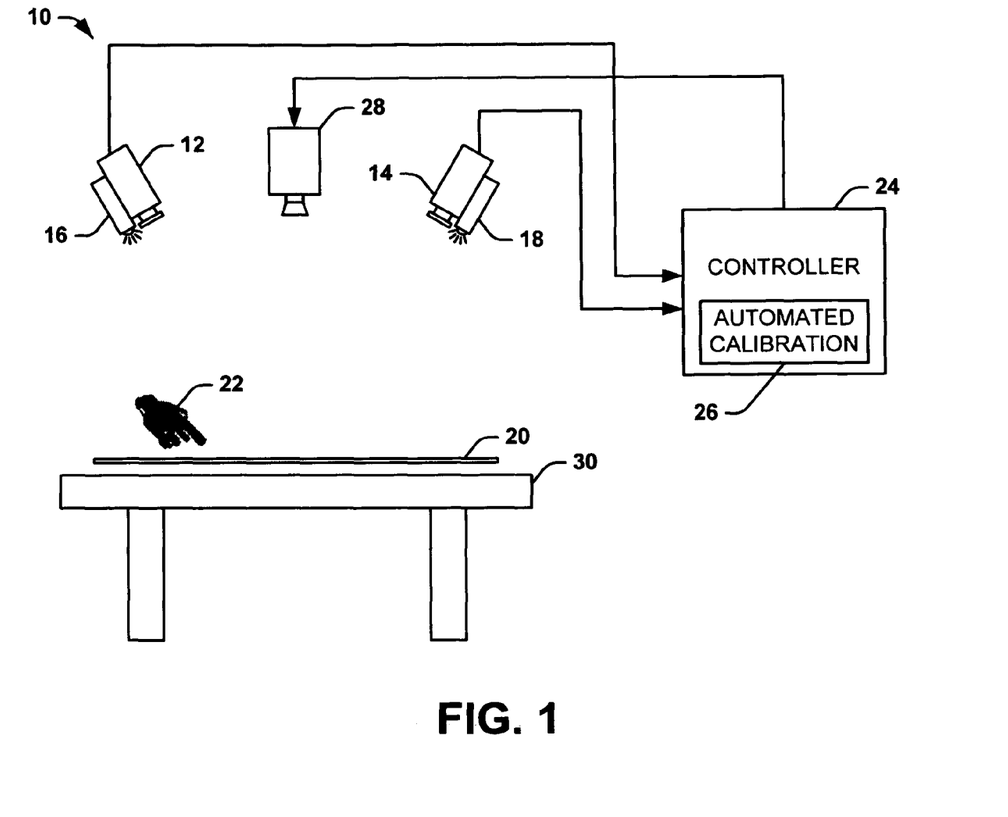
FIG. 1 illustrates an example of a gesture recognition interface system in accordance with an aspect of the invention.

FIG. 1 illustrates an example of a gesture recognition interface system 10 in accordance with an aspect of the invention. The gesture recognition interface system 10 includes a first camera 12 and a second camera 14. Coupled to each of the first camera 12 and the second camera 14, respectively, is a first IR light source 16 and a second IR light source 18. The first camera 12 and the second camera 14 may each include an IR filter, such that the respective camera may only be able to receive IR light. The first IR light source 16 and the second IR light source 18 each illuminate a retroreflective screen 20, such that IR light from the first IR light source 16 is reflected substantially directly back to the first camera 12 and IR light from the second IR light source 18 is reflected substantially directly back to the second camera 14. Accordingly, an object that is placed above the retroreflective screen 20 may reflect a significantly lesser amount of IR light back to each of the first camera 12 and the second camera 14, respectively. Therefore, such an object can appear to each of the first camera 12 and the second camera 14 as a silhouette image, such that it can appear as a substantially darker object in the foreground of a highly illuminated background surface. It is to be understood that the retroreflective screen 20 may not be completely retroreflective, but may include a Lambertian factor to facilitate viewing by users at various angles relative to the retroreflective screen 20.

A sensorless input object 22 can provide simulated inputs over the retroreflective screen 20. In the example of FIG. 1, as well as throughout the discussion in the examples of other embodiments of FIGS. 5-9, the sensorless input object 22 is demonstrated as a user's hand, such that the simulated inputs can be provided through hand gestures. It is to be understood that the use of a hand to provide simulated inputs via hand gestures is but one example implementation of the gesture recognition interface system 10. Examples of other types of sensorless input objects could include a stylus, wand, pointing stick, or any of a variety of devices that could provide gestures to simulate inputs. It is to be further understood that the sensorless input object need not be specially designed or suited for use in the gesture recognition interface system 10. For example, a user's naked hand could be used as the sensorless input object 22, and thus a user need not wear a glove that includes retroreflective material or one or more position sensors to provide gesture inputs to the gesture recognition interface system 10 in accordance with an aspect of the invention.

In the example of FIG. 1, the first camera 12 and the second camera 14 each receive separate silhouette images of the sensorless input object 22, where each of the separate silhouette images received, respectively, by the first camera 12 and the second camera 14 are a matched pair. For example, each of the first camera 12 and the second camera 14 could rapidly take still photograph images at, for example, sixty times per second, such that each still photograph image taken by the first camera 12 is matched to a still photograph image taken by the second camera 14 at substantially the same time. The sensorless input object can appear to be in a different location relative to the retroreflective screen in each silhouette image matched pair captured by each of the first camera 12 and the second camera 14, respectively, due to parallax caused by the different mounted locations of each of the first camera 12 and the second camera 14.

The first camera 12 and the second camera 14 can each provide their respective separate silhouette images of the sensorless input object 22 to a controller 24. The controller 24 could reside, for example, within a computer (not shown) for which the gesture recognition interface system 10 is designed to provide a gesture recognition interface. It is to be understood, however, that the hosting of a controller is not limited to a standalone computer, but could be included in embedded processors. The controller 24 can process the respective silhouette images associated with the sensorless input object 22 to generate three-dimensional location data associated with the sensorless input object 22. For example, each of the first camera 12 and the second camera 14 could be mounted at a predetermined angle relative to the retroreflective screen 20. For a given matched pair of images of the sensorless input object 22, if the pre-determined angle of each of the cameras 12 and 14 is equal, then each point of the sensorless input object 22 in two-dimensional space in a given image from the camera 12 is equidistant from a corresponding point of the sensorless input object 22 in the respective matched image from the camera 14. As such, the controller 24 could determine the three-dimensional physical location of the sensorless input object 22 based on a relative parallax separation of the matched pair of images of the sensorless input object 22 at a given time. In addition, using a computer algorithm, the controller 24 could also determine the three-dimensional physical location of at least one end-point, such as a fingertip, associated with the sensorless input object 22, as will be described in greater detail in the example of FIG. 3 below. Furthermore, the controller 24 can include an automated calibration unit 26, the operation of which will be described in greater detail in the example of FIG. 4 below. The automated calibration unit 26 could be a separate system working in conjunction with the controller 24, or could merely be a software routine residing within the controller 24.

The gesture recognition interface system 10 can also include a projector 28. The projector 28 can provide an output interface, such as, for example, computer monitor data, for which the user can interact and provide inputs. In the example of FIG. 1, the projector 28 can project the monitor data onto the retroreflective screen 20. Because the IR light sources 16 and 18 do not illuminate visible light, the IR illumination does not interfere with the monitor data projected from the projector 28. The user can thus employ the sensorless input object 22 directly onto the monitor data to simulate inputs, such as, for example, mouse inputs. As an example, the controller 24 could interpret two-dimensional motion of an end-point of the sensorless input object 22 across the retroreflective screen 20 as a mouse cursor, which can be projected as part of the monitor data by the projector 28. Furthermore, as another example, by determining the three-dimensional physical location of the end-point of the sensorless input object 22, the controller 24 could interpret a touch of the retroreflective screen 20 by the end-point of the sensorless input object 22 as a left mouse-click. Accordingly, a user of the gesture recognition interface system 10 could navigate through a number of computer menus associated with a computer merely by moving his or her fingertip through the air above the retroreflective screen 20 and by touching icons projected onto the retroreflective screen 20.

As will be apparent in the following discussion, the gesture recognition interface system 10 in the example of FIG. 1 is intended to represent but one example of a gesture recognition interface system in accordance with an aspect of the invention. For example, the gesture recognition interface system 10 could include more than two cameras that each supply respective silhouette images of the sensorless input object 22 to the controller 24. In addition, the example of FIG. 1 demonstrates that the retroreflective screen 20 is mounted on a table 30. It is to be understood that such an arrangement is demonstrated only for the sake of ergonomic concerns, but that the retroreflective screen 20 can be placed in a variety of different arrangements for each of the cameras 12 and 14 to be capable of receiving the respective silhouette images of the sensorless input object 22. In addition, as another example, the table 30 could mount the projector 28 underneath, such that the retroreflective screen 20 displays rear-projected monitor data. As a further example, the IR light sources 16 and 18 may not illuminate in the IR spectrum, but could instead illuminate in a different spectrum, such as narrow frequency bands of visible light, with each of the respective cameras 12 and 14 having a corresponding spectrum filter. In the example of the retroreflective screen 20 displaying a rear-projection, the light sources 16 and 18 could even illuminate visible light without impracticality.

Figure 2:
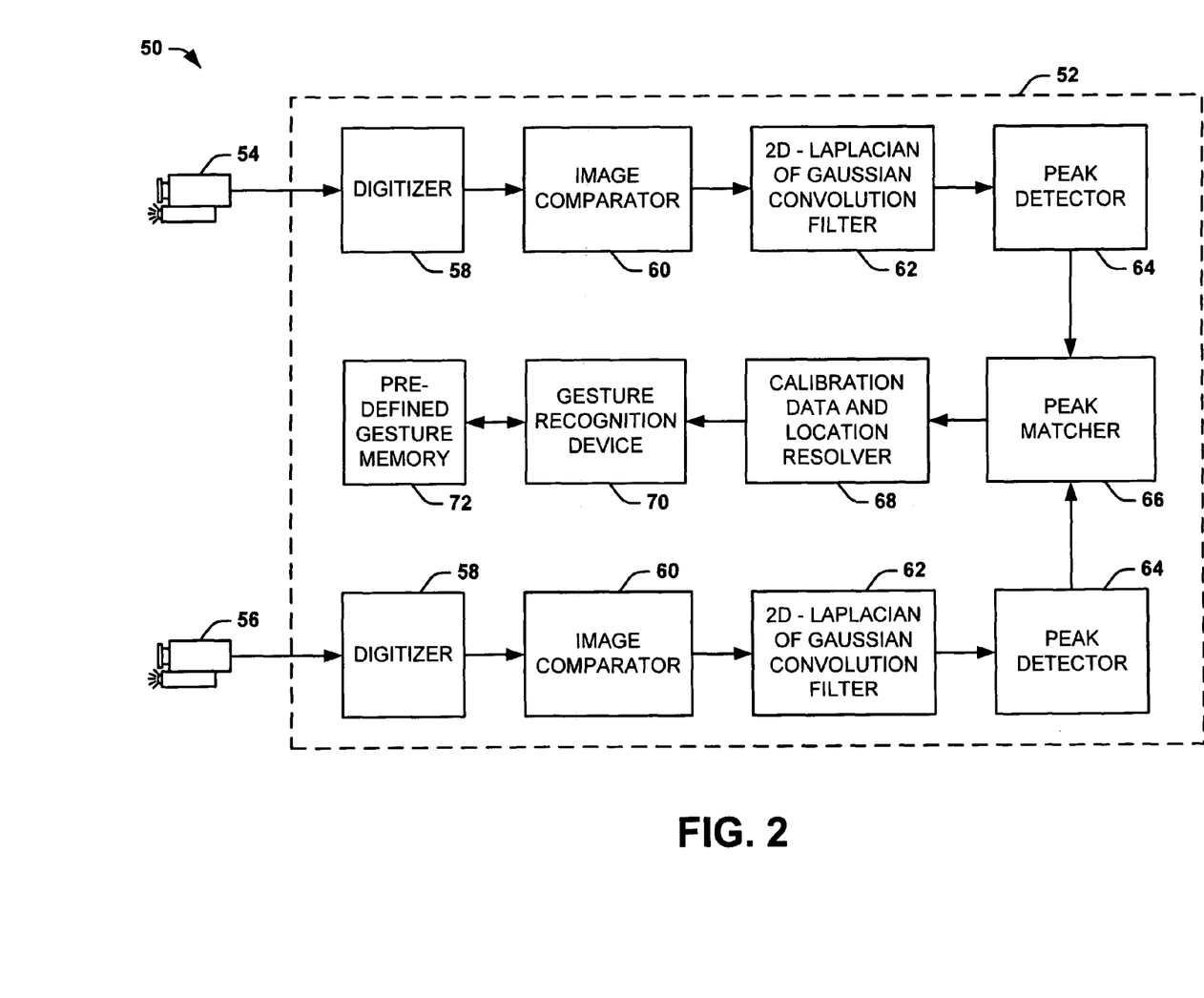
FIG. 2 illustrates another example of a gesture recognition interface system in accordance with an aspect of the invention.

FIG. 2 illustrates another example of a gesture recognition interface system 50 in accordance with an aspect of the invention. The gesture recognition interface system 50 includes a controller 52, which could be the controller 24 in the example of FIG. 1. A first camera 54 and a second camera 56 each receive a plurality of images of a sensorless input object, such as a user's hand. The respective images of the sensorless input object could be silhouette images generated from retroreflection of IR light off of a background surface.

The cameras 54 and 56 each input their respective images of a matched pair of images into a digitizer 58. The digitizer 58 produces digitized versions of the images of the sensorless input object. The digitized images of the sensorless input object are input to an image comparator 60. The image comparator 60 compares each of the digitized images of the sensorless input object to a previously stored digitized image of the sensorless input object to generate a contrast enhanced binarized silhouette image of the sensorless input object. Such a comparison allows for an improved quality of the digitized images when the illumination of the background surface, such as IR illumination in the example of FIG. 1, is not uniform across the background surface. The previously stored digitized image could have been captured during a calibration operation and/or from repeatedly storing the digitized image in memory buffers. As an example, a background model can be maintained for each of the cameras 54 and 56 without the sensorless input object being present. The background model images can be used to decide at each pixel whether the silhouette images of the sensorless input object correspond with a binary 1 or 0. In the above described example of the sensorless input object being a silhouette object in the foreground of an illuminated background, at each pixel location, if the sensorless input object silhouette image has a value that is approximately less than the corresponding background model image times a threshold scaling value of between 0 and 1, the output value will be a binary 1, thus denoting the presence of the sensorless input object. In this manner, the scaling value can be selected to provide an optimal balance between desirably detecting the sensorless input object while being substantially insensitive to residual shadows cast on the screen by an opposing source of illumination for the background surface.

The contrast enhanced binarized silhouette images of the sensorless input object are then each input to a two-dimensional Laplacian of Gaussian convolution filter 62 (hereinafter "filter"). It is to be understood that, because the image comparators 60 are operative merely to enhance the respective sensorless input object images, the filters 62 could instead each receive a digitized image of the sensorless input object output directly from the digitizers 58. The filter 62 applies a mathematical algorithm to each of the digitized images of the sensorless input object to determine the presence of one or more end-points of the sensorless input object, such as fingertips. The filter 62 generates two-dimensional data regarding the shape of the sensorless input object. It is to be understood that the example of FIG. 2 is not limited to use of the two-dimensional Laplacian of Gaussian convolution filter 62, but that any of a variety of other spatial bandpass filters can be used to determine the presence of the one or more end-points of the sensorless input object. For example, a spatial filter that attenuates at least some of both high spatial frequency and low spatial frequency data content of a given digitized silhouette image can be used instead.

The two-dimensional data output from the filter 62 is input to a peak detector 64. The peak detector 64 is tuned to determine the presence and two-dimensional location of the one or more end-points of the sensorless input object based on an adjustable threshold of the filter 62. For example, the peak detector 64 could have a threshold set, such that regions of a given Laplacian of Gaussian convolved silhouette image output from the filter 62 that exceed the threshold can be determinative of a peak. Such an operation may prevent weak peaks, such as, for example, a knuckle of a closed fist, from being falsely detected, and may strengthen positional stability of correctly detected peaks. The joint operation of the filter 62 and the peak detector 64 to determine the one or more end-points of the sensorless input object will be described in greater detail in the example of FIG. 3. It is to be understood that, in the example of FIG. 2, any of a variety of other methods for peak detection can be employed. For example, peaks can alternatively be detected through the use of a pattern matching algorithm that may scan a given silhouette image for one or more elongated finger shapes. The data output from each of the peak detectors 64 is input to a peak matcher 66.

The peak matcher 66 finds correspondences between the peaks detected by the first camera 54 and the peaks detected by the second camera 56. Various techniques can be employed to guide the correspondence process of the peak matcher 66. For example, a calibration of the stereo optical geometry associated with the first camera 54 and the second camera 56 constrains the allowed position of the correspondent peak from the first camera 54 to a contour (i.e., epipolar line) on the image of the second camera 56. In addition, detected fingertips from each of the first and second cameras 54 and 56 can be organized into groups associated with the user's hands. For example, the silhouette image that is output from each of the image comparators 60 can be used to determine connectivity of the detected fingertips to a common hand. The peak matcher 66 can use the finger-to-hand association information to further guide the process of finding correspondences between fingertips from the images associated with the first camera 54 and the second camera 56.

Figure 3:
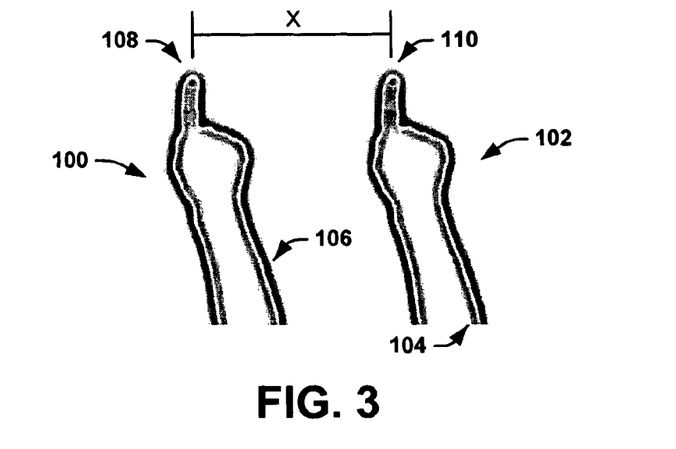
FIG. 3 illustrates an example of hand images for use in a gesture recognition interface system in accordance with an aspect of the invention.

FIG. 3 demonstrates a composite image associated with the data output from the peak matcher 66. Specifically, FIG. 3 illustrates a first image 100 and a second image 102 of a sensorless input object, demonstrated in the example of FIG. 3 as a user's hand. It is to be understood that the peak matcher 66 may not actually construct the first image 100 and the second image 102, but that the images 100 and 102 are demonstrated for illustrative purposes. It is to be further understood that, in the discussion of FIG. 3, reference will be made to FIG. 2, but the example of FIG. 3 is not limited to the gesture recognition interface system 50 of FIG. 2. The first image 100 could have been received by the first camera 54 and the second image 102 could have been received by the second camera 56. The first image 100 and the second image 102 could have been received as silhouette images by each of the respective cameras 54 and 56. Due to parallax caused by the separate locations of the cameras 54 and 56, the first image 100 and the second image 102 are demonstrated in the example of FIG. 3 as spaced apart from each other by a distance X.

In the example of FIG. 3, the first image 100 and the second image 102 have each been illustrated as having undergone a two-dimensional Laplacian of Gaussian convolution filtering and peak detection operation. Accordingly, each of the first image 100 and the second image 102 appear as they would after being output from the respective filter 62 and peak detector 64. The resultant data output from the filters 62 appears as positive and negative value pixels. The positive value pixels appear at the edges of space occupied by the user's hand, demonstrated by the lightly shaded portion 104. The negative value pixels appear at the edges of space not occupied by the user's hand, demonstrated by the darker shaded portion 106.

A brief description of the two-dimensional Laplacian of Gaussian convolution filtering operation follows. The data output from the filters 62 is achieved first by a Gaussian convolution operation, such that the pixels of the user's hand undergo an averaging distribution. The result of the Gaussian operation is such that the image of the user's hand appears blurred at the edge. A Laplacian operation is then performed on the Gaussian image, such that the pixels of the user's hand undergo a two-dimensional second derivative operation. The result of the Laplacian operation is such that the two-dimensional edge boundary of the user's hand and the surrounding space is clearly defined. When the two operations are combined, positive and negative convolution data can be ascertained, for example, resulting in the positive value pixels of the lightly shaded portion 104 and the negative value pixels of the darker shaded portion 106. It is to be understood that the polarity of the pixels could be the opposite, resulting in negative value pixels of the lightly shaded portion 104 and positive value pixels of the darker shaded portion 106, depending on the image polarity. It is to be further understood that the two-dimensional Laplacian of Gaussian convolution operation can be performed in a variety of different manners, such as, for example, by reversing the procedure to perform the Laplacian operation first. Furthermore, the two-dimensional Laplacian of Gaussian convolution filtering operation can be tuned to increase or decrease the size of the distribution of the shaded portions 104 and 106.

The positive and negative convolution data can be interpreted by the peak detector 64 to determine the presence of one or more end-points, illustrated in the example of FIG. 3 as fingertips 108 and 110. For example, the peak detector 64 could determine the presence of a fingertip in the example of FIG. 3 by evaluating the distribution of the positive value pixels in the lightly shaded portion 104. If the two-dimensional Laplacian of Gaussian convolution filtering operation is tuned to provide positive value pixels for the entirety of a user's finger, for example, then the peak detector 64 can ascertain dimensional information associated with the user's finger. From the dimensional information, the peak detector can determine the two-dimensional location of the fingertips 108 and 110. In addition, upon determining the two-dimensional location of the fingertips 108 and 110, the peak detector 64 can also ascertain dimensional information regarding the fingers themselves. For example, the peak detector 64 may be programmed to determine thickness, length, and orientation of a given elongated region that includes the end-point of a given sensorless input object, such as the fingers that include the detected fingertips. As an example, using the orientation of the one or more fingers can allow a gesture to be recognized by the gesture recognition interface 50 that is based merely on a given user pointing at the screen, such that the user's extended finger can behave as, for example, a laser pointer. As another example, determining dimensional information of the fingers could allow the gesture recognition interface 50 to recognize which of the user's fingers belong to which hand, such that, for example, a variety of two-handed gestures can be employed in operating the gesture recognition interface 50. In addition, further analysis of the silhouette information in the vicinity of the fingertips allows the gesture recognition interface 50 to recognize which fingers belong to the same hand and which hands are likely to belong to any one user of a group of users based on the position and direction of the arm silhouettes extending from each hand. For example, multiple simultaneous inputs can be recognized defining either separate gestures on a per user basis or collaborative gestures where multiple user input is required to define a single gesture. In addition, it is to be understood that other means can also be implemented to determine measurements associated with orientation, length, and thickness associated with the given elongated region of the given sensorless input object, for example, by directly analyzing the binary silhouette image.

Referring back to FIG. 2, the composite images output from the peak matcher 66 are input to a calibration data and location resolver 68. The calibration data and location resolver 68 determines a three-dimensional location of the end-points associated with the sensorless input object at a given time. For example, the example of FIG. 3 demonstrates that the fingertips of the respective images 100 and 102 of the user's hand are spaced apart by a distance X. If, for example, the cameras 54 and 56 are mounted at an equal angle relative to the background surface, the fingertip of the user's hand occupies a point that is approximately located in two-dimensional space at X/2 along a line that intersects the fingertips 108 and 110. However, differing values of X denote changes in height associated with the user's fingertip relative to the background surface. For example, as X increases, the user's fingertip is moving further away from the background surface. As X decreases, the user's fingertip is moving closer to the background surface. Therefore, the calibration data and location resolver 68 interpolates the three-dimensional location of the end-points of the sensorless input object based on parallax separation. The gesture recognition interface system 50 can be calibrated to know which values of X correspond to the height of the user's fingertip relative to the background surface, such that a given value of X could correspond to a height of zero, thus denoting a touch of the user's fingertip to the background surface.

The data output from the calibration data and location resolver 68 is input to a gesture recognition device 70. The gesture recognition device 70 interprets the three-dimensional location data associated with the one or more end-points of the sensorless input object and translates changes in the location data into an input gesture. For example, the gesture recognition device 70 could translate two-dimensional motion of the user's fingertip across the background surface as a gesture associated with mouse cursor movement. The gesture recognition device 70 could also translate a touch of the background surface as a gesture associated with a mouse left-button click. Because the gesture recognition device 70 implements the location data associated with the sensorless input object, it can be programmed to recognize any of a variety of gestures that utilize one or more fingertips of the user's hand. In this way, the gesture recognition interface system 50 has a much more versatile input capability than touch sensitive screens. For example, gestures that use multiple fingertips, or even fingertips from both hands, can be interpreted as input gestures that simulate zoom commands, rotate or "twist" commands, or even environment adjustments, such as volume and brightness control, all of which can be programmed for interpretation by the gesture recognition device 70. The gesture recognition device 70 can also be programmed to recognize gestures from multiple users simultaneously, as described above. For example, the gesture recognition device 70 can provide multi-point control capability, such that coordinated actions between two hands and/or between multiple users can be implemented. Furthermore, the gesture recognition device 70 can work in conjunction with other computer input devices, such as a conventional mouse or keyboard, to provide additional types of gesture inputs. In addition, the simulated commands may not even require touching the background surface. For example, a user could simulate a mouse left-click by rapidly moving his or her finger in a downward then upward direction in the space above the background surface, such that the gesture recognition device 70 evaluates not only changes in the three-dimensional location of the fingertip, but also a time threshold associated with its motion. Moreover, any of a variety of input gestures could be formed from six-degree of freedom motion based on changes in three-dimensional location and orientation of the sensorless input object and any associated end-points.

The controller 52 could also include a pre-defined gesture memory 72 coupled to the gesture recognition device 70. The pre-defined gesture memory 72 could include a plurality of pre-defined gestures, with each of the pre-defined gestures corresponding to a particular device input. For example, the pre-defined gesture memory 72 could include a database of specific arrangements and combinations of fingertip positions and motions that each correspond to a different computer input. The gesture recognition device 70, upon receiving the three-dimensional location data associated with the one or more end-points of the sensorless input object over a given time, could poll the pre-defined gesture memory 72 to determine if the gesture input matches a pre-defined gesture. Upon determining a match, the gesture recognition device 70 could translate the gesture input into the device input that corresponds to the pre-defined gesture. The pre-defined gesture memory 72 could be pre-programmed with the appropriate pre-defined gesture inputs, or it could be dynamically programmable, such that new gestures can be added, along with the corresponding device inputs. For example, a user could activate a "begin gesture sample" operation, perform the new gesture, capture the appropriate images of the new gesture using the first camera 54 and the second camera 56, and input the appropriate device input for which the new gesture corresponds.

It is to be understood that a given gesture recognition interface system is not intended to be limited by the example of FIGS. 2 and 3. Other implementations are possible for providing inputs in accordance with an aspect of the invention. For example, one or more of the devices in the controller 52 could be integral with other devices, or could be separate from the controller 52. For example, the cameras 54 and 56 could each input their respective images to a common digitizer 58. Some of the devices in the controller 52 may not even be necessary. For example, the gesture recognition device 70 could be programmed to interpret inputs that do not require the three-dimensional location information of an end-point, such that the functionality of the filters 62 and/or the peak detectors 64 could be obviated. Furthermore, the filters 62 and the peak detectors 64 are but one way to determine the end-points of the sensorless input object, and that other algorithms may be employed in place of a two-dimensional Laplacian of Gaussian convolution filtering operation. Accordingly, the example of FIGS. 2 and 3 is but one of a variety of ways of providing inputs in accordance with an aspect of the invention.

Figure 4:
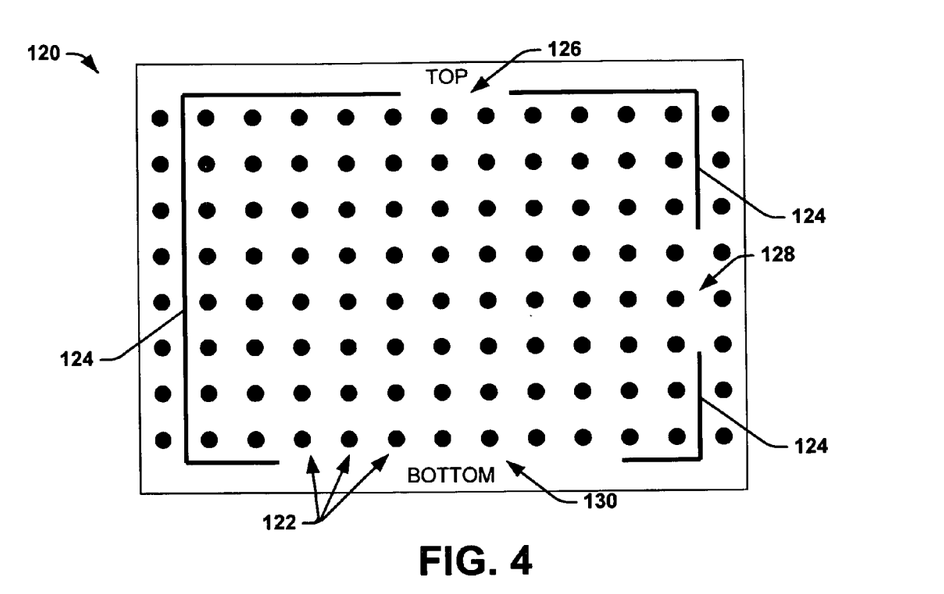
FIG. 4 illustrates an example of an automated calibration pattern for a gesture recognition interface system in accordance with an aspect of the invention.

FIG. 4 illustrates an example of an automated calibration pattern 120 for the gesture recognition interface system 10 in accordance with an aspect of the invention. The automated calibration pattern 120 can be employed by the automated calibration unit 26 in the example of FIG. 1. It is to be understood that reference will be made to the gesture recognition interface system 10 of FIG. 1, as well as the devices therein. However, the automated calibration pattern 120, as well as the accompanying calibration description below, is not intended to be limited to the gesture recognition interface system 10 in the example of FIG. 1. The automated calibration pattern 120 includes a plurality of black dots 122 and a non-continuous border 124. The automated calibration pattern 120 can be, for example, printed on a retroreflective surface that can be placed underneath and illuminated by the first and second IR light sources 16 and 18. As another example, the retroreflective surface 20 in the example of FIG. 1 can be double-sided, such that the automated calibration pattern 120 is printed on the reverse side to allow a calibration operation simply by turning the retroreflective surface 20 over. The automated calibration pattern 120 can be used by the automated calibration unit 26 to initiate an automated software algorithm that performs a calibration to permit accurate operation of the gesture recognition interface system 10.

An example of an automated calibration procedure employing the automated calibration pattern 120 follows. The non-continuous border 124 includes a gap 126, a gap 128, and a gap 130. A user places the automated calibration pattern 120 in the viewing area of the first and second cameras 12 and 14 such that the automated calibration pattern 120 is oriented in a specific top-wise and left-wise arrangement. For example, the longer side of the non-continuous border 124 with the gap 126 can be designated a top side, as indicated in the example of FIG. 4, such that the shorter side of the non-continuous border 124 with no gap is a left side. The non-continuous border 124 can be used to set a boundary for the projector 28. For example, the projector 28 can be zoomed or otherwise adjusted such that the outer edge of the output projection is aligned with the non-continuous border 124. The automated calibration unit 26 and/or the controller 24 can be programmed to recognize the non-continuous border 124 and to identify the orientation of the non-continuous border 124 via the gaps 126, 128, and 130, such that the controller 24 can be calibrated to properly identify X-Y coordinate location on the retroreflective surface 20.

Upon setting the projection boundary of the projector 28 with the non-continuous border 124, the controller can then begin a calibration operation. Upon placing the automated calibration pattern 120 in view of the first and second cameras 12 and 14 and the first and second IR light sources 16 and 18, the automated calibration unit 26 could be programmed to simply begin a calibration operation after a given amount of time has passed without the detection of any motion. Alternatively, the automated calibration unit 26 could receive an input from a user to begin a calibration operation. The automated calibration unit 26 calibrates by detecting the position of the black dots 122 via the first camera 12 relative to the second camera 14. For example, the black dots 122 can be sized to be approximately the size of a fingertip in diameter (e.g., ½"), and can thus be tuned by the automated calibration unit 26 to be detected. The parallax separation between the black dots 122, similar to the above description of the fingertips 108 and 110 in the example of FIG. 3, can thus form a calibrated location of the retroreflective surface 20. Therefore, peaks detected in the viewing area of the first camera 12 and the second camera 14 can have a three-dimensional physical location detected relative to the height of the retroreflective surface 20. Upon calibration, the controller 24 could be configured to issue a noise to signify that a calibration operation has been completed, such that the user can return the retroreflective surface 20 to the field of view of the first and second cameras 12 and 14, such as by turning it over, as described above.

It is to be understood that neither the automated calibration pattern 120 nor the manner in which a given gesture recognition interface system is calibrated are intended to be limited by the example of FIG. 4. For example, the automated calibration pattern 120, instead of being printed on a retroreflective background surface, could instead be projected by the projector 28 onto the retroreflective surface 20. As another example, although the automated calibration pattern 120 is illustrated as a series of black dots 122, the automated calibration pattern 120 could be any of a variety of patterns that are recognizable by the automated calibration unit 26. In addition, the automated calibration unit 26 may not calibrate automatically, but could be calibrated manually by a user. For example, the user could simply begin a calibration operation by placing his or her finger on the retroreflective surface 20, such as on a target point, and entering a calibration input to the automated calibration unit 26, thus forming a calibrated location of the finger at a height of zero above the retroreflective surface 20. Furthermore, the above described calibration procedure may be modified or replaced outright for any of the following additional embodiments.

Figure 5:
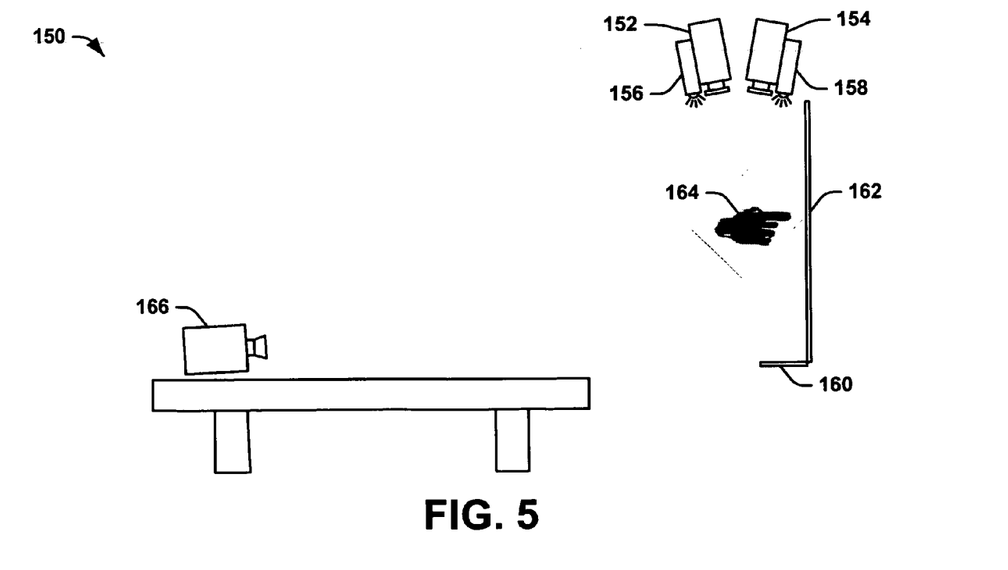
FIG. 5 illustrates another example of a gesture recognition interface system in accordance with an aspect of the invention.

FIG. 5 illustrates another example of a gesture recognition interface system 150 in accordance with an aspect of the invention. The gesture recognition interface system 150 includes a first camera 152 and a second camera 154. Coupled to each of the first camera 152 and the second camera 154, respectively, is a first IR light source 156 and a second IR light source 158. The first camera 152 and the second camera 154 may each include an IR filter, such that the respective camera may only be able to receive IR light. The first IR light source 156 and the second IR light source 158 each illuminate an area directly overhead a retroreflective strip 160. For example, the retroreflective strip 160 can be placed at the base of a vertical screen 162. In the example of FIG. 5, a sensorless input object 164 can be used to simulate inputs, as described above in the example of FIG. 1. However, in the example of FIG. 5, the three-dimensional location information associated with the sensorless input object 164 is interpreted differently by the controller (not shown) of the gesture recognition interface system 150. Specifically, in the example of FIG. 5, a touch of the vertical screen 162 is associated with motion towards the screen, as opposed to relative height as described above in the example of FIG. 1. Relative height, in the example of FIG. 5, is interpreted by the controller as motion along the height of the vertical screen 212. It is to be understood that, in the example of FIG. 5, the first camera 152 and the second camera 154 can be oriented parallel to the vertical screen 162, and thus the gesture recognition system 150 is not limited by the example of FIG. 5.

The gesture recognition interface system 150 can also include a projector 166. The projector 166 can provide an output interface, such as, for example, computer monitor data, for which the user can interact and provide inputs. In the example of FIG. 5, the projector 166 can project the monitor data onto the vertical screen 162. The user can thus employ the sensorless input object 164 directly onto the monitor data to simulate inputs, such as, for example, mouse inputs. However, in the example of FIG. 5, the vertical screen 162 is not the background surface over which gestures are recognized via brightness contrast. Therefore, the gesture recognition interface system 150 in the example of FIG. 5 may be more suitable for presentations to a larger audience, as the vertical screen 162 may be more readily viewable by a larger audience than the retroreflective screen 20 described above in the example of FIG. 1.

Figure 6:
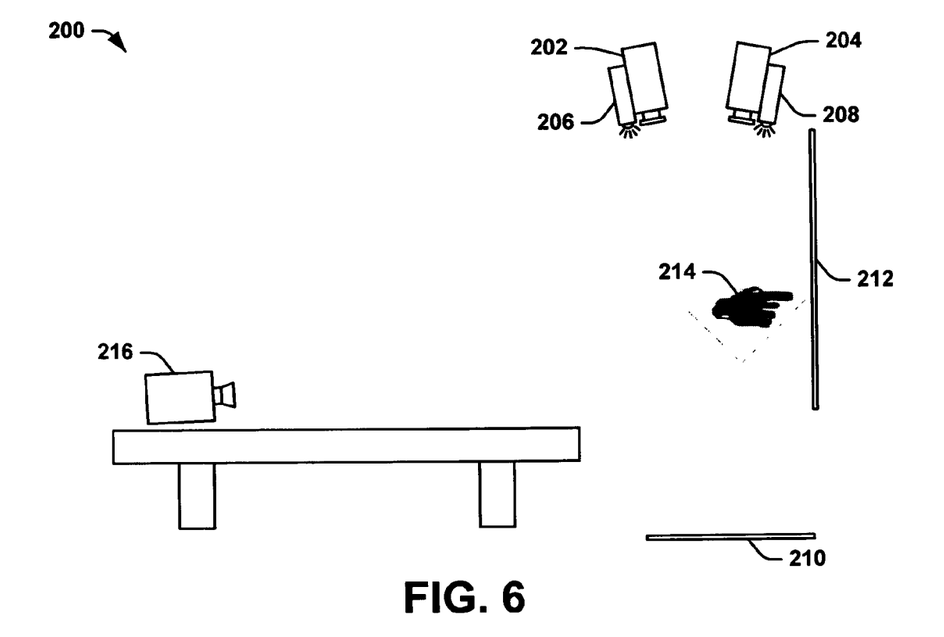
FIG. 6 illustrates another example of a gesture recognition interface system in accordance with an aspect of the invention.

FIG. 6 illustrates an example of a gesture recognition interface system 200 in accordance with an aspect of the invention. The gesture recognition interface system 200 includes a first camera 202 and a second camera 204. Coupled to each of the first camera 202 and the second camera 204, respectively, is a first IR light source 206 and a second IR light source 208. The first camera 202 and the second camera 204 may each include an IR filter, such that the respective camera may only be able to receive IR light. The first IR light source 206 and the second IR light source 208 each illuminate an area directly overhead an IR dampening pad 210. For example, the IR dampening pad 210 can be placed on the floor directly in front of a vertical screen 212. In the example of FIG. 6, a sensorless input object 214 can be used to simulate inputs, as described above in the example of FIG. 1. In addition, a projector 216 can project monitor data onto the vertical screen 212. Similar to the example of FIG. 6 above, the vertical screen 212 is not the background surface over which gestures are recognized via brightness contrast, and thus the gesture recognition interface system 200 may be more suitable for presentations to a larger audience. It is to be understood that, in the example of FIG. 6, the first camera 202 and the second camera 204 can be oriented parallel to the vertical screen 212, and thus the gesture recognition system 200 is not limited by the example of FIG. 6.

In the example of FIG. 6, the sensorless input object 214 is more retroreflective than the background surface, and thus the gesture recognition interface system 200 exploits a brightness contrast of the images of the sensorless input object 214 in the opposite sense of the example of FIG. 1. Specifically, the controller (not shown) of the gesture recognition interface system 200 interprets inputs using bright images of the sensorless input object 214 against a dark background surface, as opposed to silhouette images against a bright background surface, as described above in the example of FIG. 1.

It is to be understood that the IR dampening pad 210 provides a dim contrast relative to the reflection of IR light from the sensorless input object 214. Therefore, other ways of providing a brightness contrast between the sensorless input object 214 and a background surface are possible in the example of FIG. 6. An object is illuminated at a brightness that is $1/D^2$, where D is the distance from the light source. Accordingly, an object that is twice as far away as another appears four times dimmer. Therefore, for example, if the carpet underneath the cameras 202 and 204 and IR light sources 206 and 208 is dark enough, the IR dampening pad 210 may not be necessary. Alternatively, a user could wear a retroreflective glove to increase the reflection of IR light back into the cameras 202 and 204, though the use of retroreflective aids may not be necessary in accordance with an aspect of the invention. Accordingly, the example of FIG. 6 merely demonstrates a gesture recognition interface that is based on providing a sufficient brightness contrast between the sensorless input object 214 and the background surface.

Figure 7:
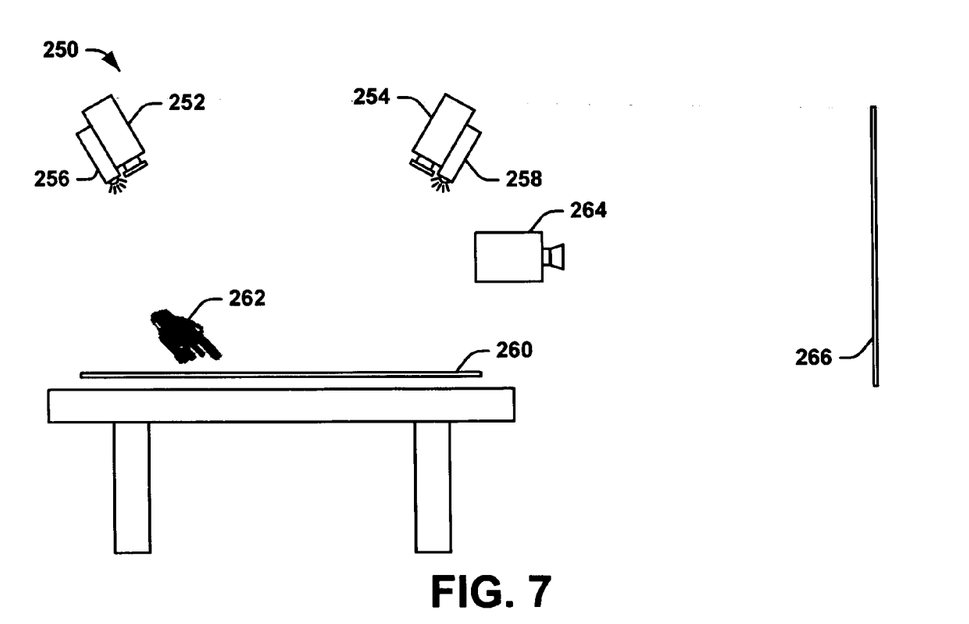
FIG. 7 illustrates another example of a gesture recognition interface system in accordance with an aspect of the invention.

FIG. 7 illustrates another example of a gesture recognition interface system 250 in accordance with an aspect of the invention. The gesture recognition interface system 250 includes a first camera 252 and a second camera 254. Coupled to each of the first camera 252 and the second camera 254, respectively, is a first IR light source 256 and a second IR light source 258. The first camera 252 and the second camera 254 may each include an IR filter, such that the respective camera may only be able to receive IR light. The first IR light source 256 and the second IR light source 258 each illuminate an area directly overhead a retroreflective surface 260. In the example of FIG. 7, a sensorless input object 262 is used to simulate inputs via gestures over the retroreflective surface 260, as described above in the example of FIG. 1.

The gesture recognition interface system 250 can also include a projector 264. The projector 264 can provide an output interface, such as, for example, computer monitor data, for which the user can interact and provide inputs. The projector 264 can project the monitor data onto a vertical screen 266. However, in the example of FIG. 7, the retroreflective screen 260 and the vertical screen 266 are disassociated, such that the user simulates inputs at a location that is separate from the output display. In this way, since the user does not simulate outputs directly at the output display location, the projector 264 and the vertical screen 266 can provide an unobstructed view for presentation to a large audience. Alternatively, the gesture recognition interface system 250 could be used for a more personal application, such that a smaller, desk-mounted version of the gesture recognition interface system 250 can provide inputs to a personal computer, such that the projector 264 and the vertical screen 266 could be replaced by a desk-top monitor. Accordingly, the gesture recognition interface system 250 can be employed to provide inputs in any application where the simulated inputs cannot or need not be provided at the output device.

Figure 8:
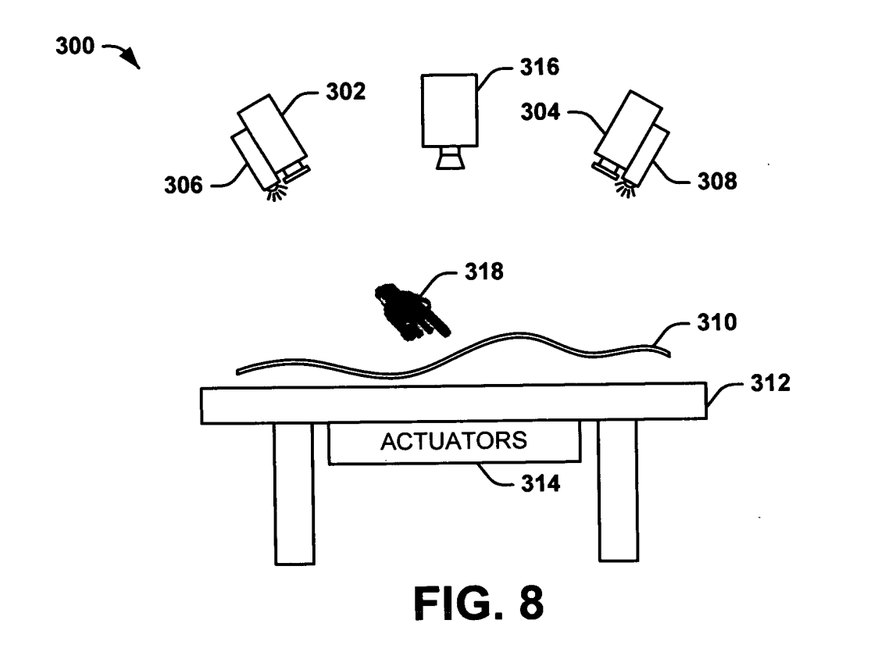
FIG. 8 illustrates another example of a gesture recognition interface system in accordance with an aspect of the invention.

FIG. 8 illustrates an example of a gesture recognition interface system 300 in accordance with an aspect of the invention. The gesture recognition interface system 300 includes a first camera 302 and a second camera 304. Coupled to each of the first camera 302 and the second camera 304, respectively, is a first IR light source 306 and a second IR light source 308. The first camera 302 and the second camera 304 may each include an IR filter, such that the respective camera may only be able to receive IR light. The first IR light source 306 and the second IR light source 308 each illuminate a retroreflective screen 310 mounted on a table 312, such that IR light from the first IR light source 306 is reflected substantially directly back to the first camera 302 and IR light from the second IR light source 308 is reflected substantially directly back to the second camera 304. In the example of FIG. 8, a sensorless input object 318 is used to simulate inputs via gestures over the retroreflective screen 310, as described above in the example of FIG. 1.

In the example of FIG. 8, the table 312 includes actuators 314 located underneath its surface, and the retroreflective screen 310 is demonstrated as non-planar. As an example, the retroreflective screen 310 could be flexible membrane that can have changeable contours through the action of the actuators 314. Accordingly, the retroreflective screen could act as a topographic display. Such an arrangement could be used, for example, in military battlefield or emergency rescue applications. In such an arrangement, a projector 316 could project a topographical image of a geographical area, and the actuators 314 could simulate elevated terrain therein.

The simulated inputs could be used to mark positions or draw routes on the topographic display projected onto the retroreflective screen 310. The first camera 302 and the second camera 304 can each provide their respective separate silhouette images of the sensorless input object 318 to a controller (not shown) of the gesture recognition interface system 300. The controller can process the respective silhouette images associated with the sensorless input object 318 to generate three-dimensional location data associated with one or more end-points of the sensorless input object 318. However, the controller also receives data from the actuators 314, the actuator data corresponding to a three-dimensional height function associated with the retroreflective surface 310. Accordingly, the three-dimensional location data of the one or more end-points associated with the sensorless input object 318 is calculated by the controller with reference to a given height of the retroreflective surface 310 at a given point in two-dimensional space over which the one or more end-points are located. Therefore, the controller can determine when a user touches the retroreflective screen 310, despite it having a variable height. Accordingly, it is to be understood that the example of FIG. 8 demonstrates that a given gesture recognition interface system can be utilized in both two-dimensional and three-dimensional display applications.

Figure 9:
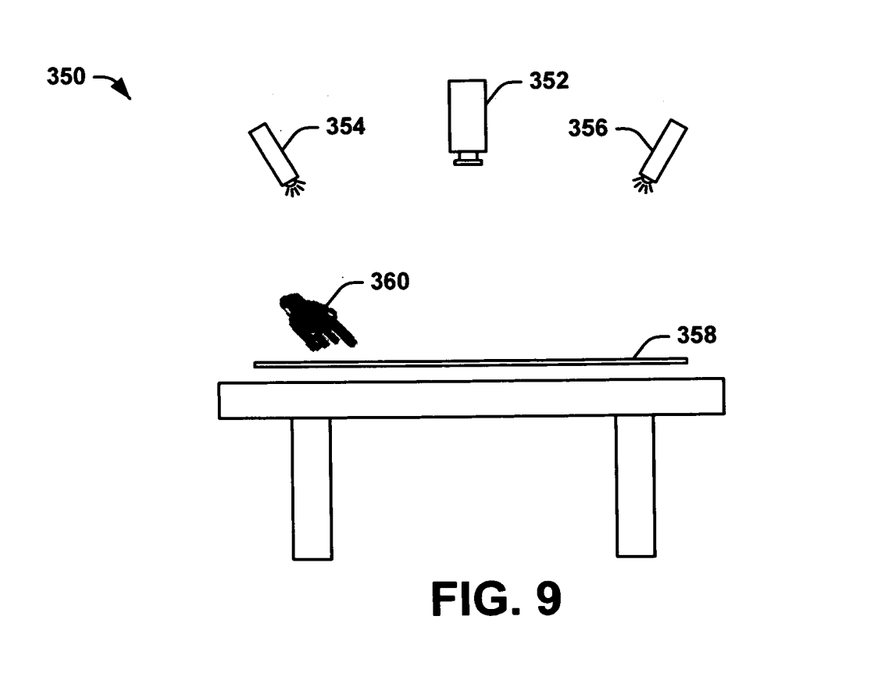
FIG. 9 illustrates another example of a gesture recognition interface system in accordance with an aspect of the invention.

FIG. 9 illustrates another example of a gesture recognition interface system 350 in accordance with an aspect of the invention. The gesture recognition interface system 350 includes a single camera 352. The camera 352 may include an IR filter, such that it may only be able to receive IR light. The gesture recognition interface system 350 can also include a first IR light source 354 and a second IR light source 356. As opposed to the previous examples of FIGS. 1 and 5-8, in the example of FIG. 9 the first IR light source 354 and the second IR light source 356 are not coupled to a camera, but are mounted independently. In the example of FIG. 9, each of the IR light sources 354 and 356 illuminate a horizontal screen 358. The horizontal screen 358 could be an output display, such that it could receive monitor data from a projector (not shown) mounted overhead, or from a rear-projector. In the example of FIG. 9, a sensorless input object 360 is used to simulate inputs via gestures over the horizontal screen 358, as described above in the example of FIG. 1.

In the example of FIG. 9, each of the IR light sources 354 and 356 could alternate illumination of the horizontal screen 358 at a fixed interval. For example, each of the IR light sources 354 and 356 could pulse at thirty times per second, for a total of sixty pulses per second. At each pulse, the camera 352 could receive an image, such that the camera 352 receives sixty images per second, thirty of which are illuminated by the IR light source 354 and the other thirty of which are illuminated by the IR light source 356. Accordingly, two sequential images, one being associated with the first IR light source 354 and the other being associated with the second IR light source 356, could form a matched pair of images of the sensorless input object. As the horizontal screen 358 may not be retroreflective, as opposed to the example of FIG. 1 above, the images received by the camera 352 may be shadow images of the sensorless input object 360. In addition, the IR light sources 354 and 356 may be equidistant from the camera 352. Accordingly, the alternate shadow images received by the camera 352 may be offset equidistant from the actual location of the sensorless input object 360 in two-dimensional space due to parallax.

It is to be understood that the controller (not shown) of the gesture recognition interface system 350 in the example of FIG. 9 could process the matched pair of images of the sensorless input object 360 in a manner similar to that described above in the example of FIGS. 1-3, despite the gesture recognition interface system 350 providing a different manner of brightness contrast for the separate images. In addition, the controller could process the simulated inputs in a different manner. For example, the IR light sources 354 and 356 could provide constant illumination, as opposed to alternate illumination, such that the camera 352 receives, and the controller processes, a composite image of the sensorless input object 360 at a given time.

It is to be understood that FIGS. 1-9 provide examples of gesture recognition interface implementations in accordance with an aspect of the invention. The examples provided are not meant to be mutually exclusive with respect to one another. Therefore, the examples of FIGS. 1-9 could be combined to create other permutations for providing an interface. As an example, the acquisition and processing of shadow images of a user controlled sensorless input object, as described in the example of FIG. 9, could be combined with the remote output display described in the example of FIG. 7. Therefore, the examples of FIGS. 1-9 are not intended to be limited in their individual implementations.

Figure 10:
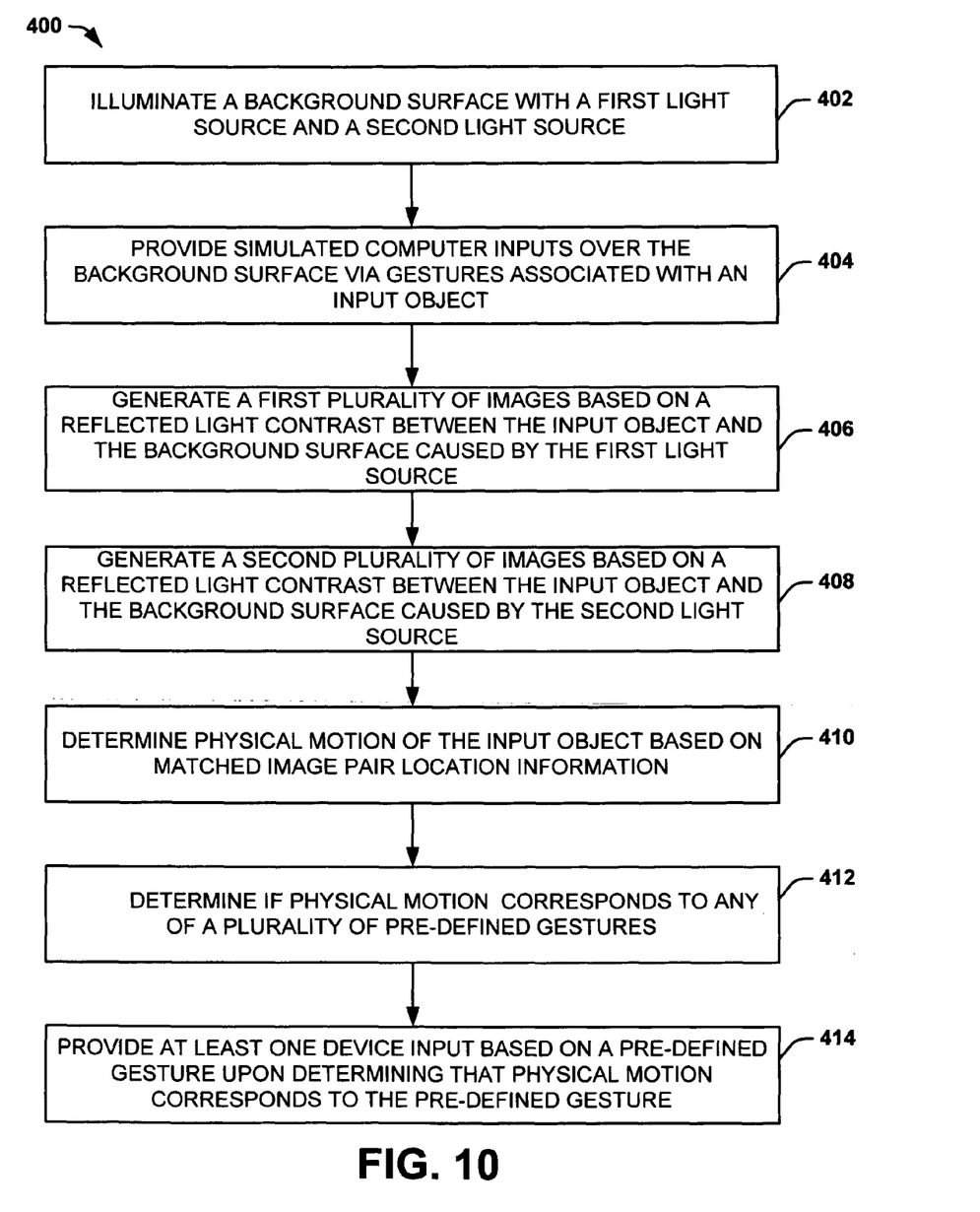
FIG. 10 illustrates an example of a method for providing inputs to a computer in accordance with an aspect of the invention.

In view of the foregoing structural and functional features described above, a methodology in accordance with various aspects of the present invention will be better appreciated with reference to FIG. 10. While, for purposes of simplicity of explanation, the methodologies of FIG. 10 are shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect of the present invention.

FIG. 10 illustrates an example of a method 400 for providing inputs in accordance with an aspect of the invention. At 402, a background surface is illuminated with a first light source and second light source. The illumination could be provided by IR light sources, and the background surface could be retroreflective. The background surface could also be an output display, such that it displays computer monitor data. At 404, a user provides simulated inputs over the background surface via gestures associated with a sensorless input object. The sensorless input object could be the user's hand, such that the user simulates the inputs via hand gestures. In addition, the simulated inputs could be simulated mouse inputs, zoom commands, or rotate commands.

At 406, a first plurality of images of the sensorless input object are generated based on a reflected light contrast between the user controlled sensorless input object and the illuminated background surface caused by the first light source. At 408, a second plurality of images of the sensorless input object are generated based on a reflected light contrast between the user controlled sensorless input object and the illuminated background surface caused by the second light source. The plurality of images could be a plurality of matched pairs of images, such that each image of the matched pair corresponds to the sensorless input object from a different perspective at substantially the same time. In the example of a retroreflective background surface, the background surface could appear to be much brighter than the user controlled sensorless input object. Therefore, the plurality of images could be silhouette images of the user controlled sensorless input object. Alternatively, the background surface could be far away, or IR dampening, such that the user controlled sensorless input object appears brighter. Therefore, the plurality of images could be illuminated images. As another alternative, the background surface could be non-retroreflective, and the illumination could be from alternating IR light sources. Therefore, the plurality of images could be shadow images of the sensorless input object.

At 410, physical motion of the sensorless input object is determined based on the matched image pair location information. For example, a location of the sensorless input object can be determined by interpolating a first image associated with the first light source and a second image associated with a second light source of a matched image pair, and physical motion can be determined by evaluating a plurality of locations of the sensorless input object. A three-dimensional location of at least one end-point of the sensorless input object could be determined relative to the background surface. The at least one end-point could be one or more of the user's fingertips. Changes in location of the three-dimensional location of at least one end-point of the sensorless input object could be determinative of the physical motion of the sensorless input object. At 412, it is determined whether the physical motion associated with the sensorless input object corresponds to any of a plurality of pre-defined gestures. The pre-defined gestures could be stored in a memory. Each pre-defined gesture could be associated with a different device input. At 414, at least one device input is provided based on determining that the physical motion associated with the sensorless input object corresponds to a given one of the pre-defined gestures. Device inputs could be mouse inputs, such that two-dimensional motion across the background surface could simulate motion of a mouse cursor, and a touch of the background surface could simulate a mouse left-click. In addition, motion associated with multiple end-points could provide different types of inputs, such as rotate and zoom commands.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A gesture recognition interface system comprising:
   a first IR light source and a second IR light source positioned to illuminate a retroreflective background surface;
   a first IR filtered camera operative to receive a first plurality of images based on a first reflected light contrast difference between the retroreflective background surface and a sensorless input object caused by the first IR light source and a second IR filtered camera operative to receive a second plurality of images based on a second reflected light contrast difference between the retroreflective background surface and the sensorless input object caused by the second IR light source, the first and second pluralities of images being respective silhouette images of the sensorless input object; and
   a controller operative to determine a given input gesture based on changes in relative locations of the sensorless input object in the first plurality of images and the second plurality of images, and being further operative to initiate a device input associated with the given input gesture.

2. The interface system of claim 1, wherein the sensorless input object is a user's hand.

3. The interface system of claim 2, wherein the controller is further operative to determine a three-dimensional physical location of each extended fingertip associated with the user's hand, and wherein the one or more of the user's hand gestures are associated with changes in the three-dimensional physical location of each extended fingertip.

4. The interface system of claim 1, wherein the given input gesture corresponds to one of a mouse command, a zoom command, a rotate command, an environment command, and a laser pointer gesture.

5. The interface system of claim 1, wherein the given input gesture is a six-degree of freedom input gesture based on changes in a three-dimensional location and an orientation of the sensorless input object.

6. The interface system of claim 1, wherein the controller comprises a plurality of peak detectors that are operative to determine a three-dimensional physical location of at least one end-point of the sensorless input object associated with each of the first plurality of images and the second plurality of images of the sensorless input object.

7. The interface system of claim 6, wherein the controller is further operative to determine a length, a thickness, and an orientation of the sensorless input object at elongated regions that comprise the at least one end-point of the sensorless input object.

8. The interface system of claim 6, wherein the retroreflective background surface is non-planar, and wherein the controller determines the three-dimensional physical location of the at least one end-point of the sensorless input object relative to a three-dimensional height function associated with the retroreflective background surface.

9. The interface system of claim 6, wherein each of the plurality of peak detectors is associated with the first plurality of images and the second plurality of images of the sensorless input object, respectively, such that each of the plurality of peak detectors determines a two-dimensional physical location of the at least one end-point of the sensorless input object, and further comprising a location resolver operative to interpolate the three-dimensional physical location of the at least one end-point of the sensorless input object based on each two-dimensional physical location of the at least one end-point of the sensorless input object associated with the respective one of the plurality of peak detectors.

10. The interface system of claim 9, wherein the controller further comprises a two-dimensional Laplacian of Gaussian convolution filter associated with each of the plurality of peak detectors, the two-dimensional Laplacian of Gaussian convolution filter being operative to input either the first and second plurality of images or a contrast enhanced version of the first and second plurality of images, such that the plurality of peak detectors determine the two-dimensional physical location of the at least one end-point of the sensorless input object based on a convolution filtered output from the respective two-dimensional Laplacian of Gaussian convolution filter.

11. The interface system of claim 9, wherein the controller further comprises a spatial bandpass filter associated with each of the plurality of peak detectors, the spatial bandpass filter being operative to input either the first and second plurality of images or a contrast enhanced version of the first and second plurality of images, such that the plurality of peak detectors determine the two-dimensional physical location of the at least one end-point of the sensorless input object based on a filtered output from the respective spatial bandpass filter.

12. The interface system of claim 1, wherein the retroreflective background surface is also operative as a display device, such that the retroreflective background surface operates as a touchscreen input/output device that allows a user to interact with each portion of displayed visual content on the retroreflective background surface via touch gestures.

13. The interface system of claim 1, wherein the first plurality of images and the second plurality of images comprise a plurality of matched pairs of images of the sensorless input object, and wherein the controller determines a three-dimensional physical location of the sensorless input object relative to the retroreflective background surface based on an amount of parallax separation between the matched pairs of images of the sensorless input object.

14. The interface system of claim 13, wherein the controller comprises an automated calibration unit operative to calibrate the gesture recognition interface system based on an amount of parallax separation between matched pairs of images of a calibration pattern on the retroreflective background surface.

15. The interface system of claim 1, wherein the controller comprises a memory operative to store a plurality of pre-defined gestures, and wherein the controller determines the given input gesture based on a comparison of the relative locations of the first plurality of images and the second plurality of images with the plurality of pre-defined gestures.

16. The interface system of claim 15, wherein the memory is further operative to be programmed with additional pre-defined gestures, the additional pre-defined gestures being input to the memory based on a user performing gestures to which the additional pre-defined gestures correspond.

17. A method of providing device inputs, the method comprising:
- illuminating a retroreflective background surface with a first IR light source and a second IR light source;
- providing simulated inputs over the retroreflective background surface via gestures associated with a sensorless input object;
- generating a first plurality of silhouette images associated with the sensorless input object based on a reflected light contrast between the sensorless input object and the illuminated retroreflective background surface caused by the first IR light source;
- generating a second plurality of silhouette images associated with the sensorless input object based on a reflected light contrast between the sensorless input object and the illuminated retroreflective background surface caused by the second IR light source;
- determining a plurality of three-dimensional physical locations of the sensorless input object based on a relative separation of the sensorless input object in the first plurality of silhouette images relative to the second plurality of silhouette images;
- determining if changes in the plurality of three-dimensional physical locations of the sensorless input object correspond to any of a plurality of pre-defined gestures; and
- providing at least one device input based on a given one of the plurality of pre-defined gestures upon determining that the changes in the plurality of three-dimensional physical locations of the sensorless input object correspond to the given one of the plurality of pre-defined gestures.

18. The method of claim 17, wherein providing simulated inputs over the background surface comprises providing simulated inputs via gestures associated with a user's hand over the background surface.

19. The method of claim 18, wherein determining the plurality of three-dimensional physical locations of the sensorless input object comprises determining a plurality of three-dimensional physical locations of each extended fingertip associated with the user's hand.

20. The method of claim 17, wherein generating the first plurality of silhouette images associated with the sensorless input object and generating the second plurality of silhouette images associated with the sensorless input object comprises generating a matched pair of silhouette images associated with the sensorless input object, and wherein determining the plurality of three-dimensional physical locations of the sensorless input object comprises determining a plurality of three-dimensional physical locations of at least one end-point associated with the sensorless input object.

21. The method of claim 20, wherein illuminating the background surface comprises illuminating a non-planar background surface, and wherein determining the plurality of three-dimensional physical locations of the at least one end-point associated with the sensorless input object comprises determining a plurality of three-dimensional physical locations of the at least one end-point associated with the sensorless input object relative to a three-dimensional height function associated with the non-planar background surface.

22. The method of claim 20, wherein determining the plurality of three-dimensional physical locations of the at least one end-point associated with the sensorless input object comprises either performing a two-dimensional Laplacian of Gaussian convolution operation on each of the first plurality of silhouette images associated with the sensorless input object and each of the second plurality of silhouette images associated with the sensorless input object, or performing a two-dimensional Laplacian of Gaussian convolution operation on a contrast enhanced version of each of the first plurality of silhouette images associated with the sensorless input object and a contrast enhanced version of each of the second plurality of silhouette images associated with the sensorless input object.

23. The method of claim 20, wherein determining the plurality of three-dimensional physical locations of the at least one end-point associated with the sensorless input object comprises determining a height of the at least one end-point associated with the sensorless input object relative to the illuminated background surface based on an amount of parallax separation between the first plurality of silhouette images and the second plurality of silhouette images of the sensorless input object.

24. The method of claim 23, further comprising calibrating the determined height of the at least one end-point based on an amount of parallax separation between a first plurality of images of a calibration pattern on the background surface and a second plurality of images of the calibration pattern on the background surface.

25. The method of claim 17, further comprising displaying output data on the illuminated background surface, such that the illuminated background surface operates as a touchscreen input/output device, wherein providing at least one device input comprises providing the device input as a touch input corresponding to interaction with displayed visual content displayed at any point on the background surface.

26. A gesture recognition interface system comprising:
- a first IR light source configured to provide a first brightness contrast between a retroreflective background surface and a sensorless input object;
- a second IR light source configured to provide a second brightness contrast between the retroreflective background surface and a sensorless input object;
- a first IR filtered camera configured to generate a first plurality of silhouette images of the sensorless input object based on the first brightness contrast;
- a second IR filtered camera configured to generate a second plurality of silhouette images of the sensorless input object based on the second brightness contrast, the first plurality of images and the second plurality of images forming a plurality of matched pairs of silhouette images of the sensorless input object;
- a peak detector configured to generate two-dimensional location information associated with at least one end-point of the sensorless input object for each of the first plurality of images and the second plurality of images;
- a location resolver configured to interpolate three-dimensional location information associated with the sensorless input object based on the two-dimensional location information associated with the at least one end-point of the sensorless input object for each of the plurality of matched pairs of images of the sensorless input object;
- a gesture recognition device configured to translate changes in the three-dimensional location information associated with at least one end-point of the sensorless input object to a given input gesture, and to provide device inputs based on matching the given input gesture with one of a plurality of pre-defined gestures.

27. The interface system of claim 26, wherein the gesture recognition device is configured to provide the device inputs based on matching the given input gesture with one of a plurality of pre-defined gestures associated with a user's hand.

28. The interface system of claim 26, further comprising a projector configured to display output information on the background surface, such that the background surface operates as a touchscreen input/output device that allows a user to interact with each portion of displayed visual content on the background surface via touch gestures.

29. The interface system of claim 26, further comprising a calibration component configured to calibrate the location resolver based on an amount of parallax separation of a matched pair of silhouette images of a calibration pattern on the background surface.

* * * * *